US012630095B2

(12) United States Patent (10) Patent No.: US 12,630,095 B2
Heiner et al. (45) Date of Patent: May 19, 2026

(54) METHOD AND APPARATUS FOR A VEHICLE ACCESSORY MOUNT SYSTEM

(71) Applicant: Letzroll Metalworks LLC, Mesa, AZ (US)

(72) Inventors: Johnathan J Heiner, Mesa, AZ (US); Andrew McLaughlin, Mesa, AZ (US)

(73) Assignee: LetzRoll Metalworks LLC, Mesa, AZ (US)

( * ) Notice: Subject to any disclaimer, the term of this patent is extended or adjusted under 35 U.S.C. 154(b) by 48 days.

(21) Appl. No.: 18/622,995

(22) Filed: Mar. 31, 2024

(65) Prior Publication Data

US 2024/0326701 A1 Oct. 3, 2024

Related U.S. Application Data

(60) Provisional application No. 63/456,508, filed on Apr. 2, 2023.

(51) Int. Cl.
B60R 9/052 (2006.01)
B60R 9/058 (2006.01)
(52) U.S. Cl.
CPC .................................... B60R 9/052 (2013.01)
(58) Field of Classification Search
CPC .. B60R 9/058; B60R 9/04; B60R 9/00; B60R 9/052; B60R 2011/0061; B60R 2011/0059; B60R 2011/0071; B60R 2011/0073; B60R 2011/0078; B60P 7/0807
USPC ................................. 224/326, 329, 331, 557
See application file for complete search history.

(56) References Cited

U.S. PATENT DOCUMENTS

| | | | |
|---|---|---|---|
| 10,787,131 B2 * | 9/2020 | Marchlewski ............ | B60R 9/04 |
| 2014/0097218 A1 * | 4/2014 | Bittner .................... | B60R 9/058 |
| | | | 224/309 |
| 2019/0315210 A1 * | 10/2019 | Stojkovic ................ | B60R 9/058 |

* cited by examiner

*Primary Examiner* — Jack W Lavinder
(74) *Attorney, Agent, or Firm* — Michael T. Wallace

(57) ABSTRACT

A vehicle accessory mount system is provided that substantially eliminates the need for an external framework mounted to the vehicle. All load bearing framework is instead concealed within an interior of the vehicle while only the mount points to the load bearing framework are externalized. The mount points may accommodate virtually any automotive accessory that can be mounted to a vehicle and may be plugged in order to conceal the mounts from sight thereby improving aesthetics and reducing the effects of drag when a vehicle accessory is not in use.

20 Claims, 4 Drawing Sheets

300

304

308

306

308

308

306

302

306

308

METHOD AND APPARATUS FOR A VEHICLE ACCESSORY MOUNT SYSTEM

FIELD OF THE INVENTION

The present invention generally relates to vehicle accessory mount systems, and more particularly to vehicle accessory mount systems that may be concealed within the interior of the vehicle.

BACKGROUND

Certain conventional vehicle accessory mount systems necessitate the use of an exoskeleton framework in order to provide sufficient load bearing capability for the attached vehicle accessory. Exoskeleton frameworks, however, often require permanent mounting solutions to be employed which requires that the exoskeleton framework remain mounted to an exterior of the vehicle whether or not a vehicle accessory is mounted thereto. As a result, the exoskeleton framework increases wind resistance while detracting from the aesthetic appearance of the vehicle.

Other conventional vehicle accessory mount systems employ temporary mounting solutions that may facilitate use of the vehicle's external features, such as its rain gutters or side rails, to facilitate either clamping or strapping a vehicle accessory to the vehicle's roof top. While such conventional mount solutions allow for their removal while not in use, they also suffer from substantially reduced load bearing capability. As a result, a temporary vehicle accessory mount system may be precluded from use when the weight of the associated vehicle accessory is in excess of the reduced load bearing capability of the temporary vehicle accessory mount.

Efforts continue, therefore, to develop vehicle accessory mount systems that are substantially hidden from external view while providing substantially increased load bearing capability.

SUMMARY

To overcome limitations in the prior art, and to overcome other limitations that will become apparent upon reading and understanding the present specification, various embodiments of the present invention disclose a load bearing framework that includes the vehicle's endoskeleton and is substantially located within an interior of the vehicle. The load bearing framework may be accessible from an exterior of the vehicle via substantially hidden mount points to accommodate virtually any vehicle accessory that may be mounted to a vehicle. Such accessories may include without limitation tents, boats, skis, camping accessories, building products, etc. All such vehicle accessories may be readily interchangeable with the load bearing framework and when not in use, the associated mount points may be substantially concealed to minimize wind resistance and maximize aesthetic appeal.

In accordance with one embodiment of the invention, a vehicle accessory mount system comprises a vehicle having a roof and a load bearing framework arranged within an interior of the vehicle. The load bearing framework includes a plurality of sockets extending through the roof. The vehicle accessory mount system further includes a vehicle accessory removably coupled to the load bearing framework. The vehicle accessory includes a plurality of posts removably coupled to the corresponding plurality of sockets.

In accordance with an alternate embodiment of the invention, a vehicle accessory mount system comprises a vehicle and a load bearing framework arranged within an interior of the vehicle. The load bearing framework includes a plurality of sockets. The vehicle accessory mount system further includes a vehicle accessory removably coupled to the load bearing framework. The vehicle accessory includes a plurality of posts removably coupled to the corresponding plurality of sockets.

In accordance with an alternate embodiment of the invention, a method of mounting accessories to a vehicle comprises disposing a load bearing framework within an interior of a vehicle, arranging a plurality of sockets on the load bearing framework to be accessible from an exterior of the vehicle and removably coupling an accessory to the plurality of sockets.

BRIEF DESCRIPTION OF THE DRAWINGS

Various aspects and advantages of the invention will become apparent upon review of the following detailed description and upon reference to the drawings in which.

DETAILED DESCRIPTION

Generally, the various embodiments of the present invention are applied to a vehicle accessory mount system that utilizes an endoskeleton within an interior of a vehicle as part of a load bearing framework. The load bearing framework further includes brackets with mount points that provide access from an exterior of the vehicle and may be virtually hidden when no vehicle accessory is mounted to the vehicle. Furthermore, the load bearing framework and associated mount points remain virtually hidden from view when in use to provide interchangeable access to virtually any accessory that may mounted to a vehicle, including without limitation tents, boats, skis, camping accessories, building products, etc.

Figure 1:
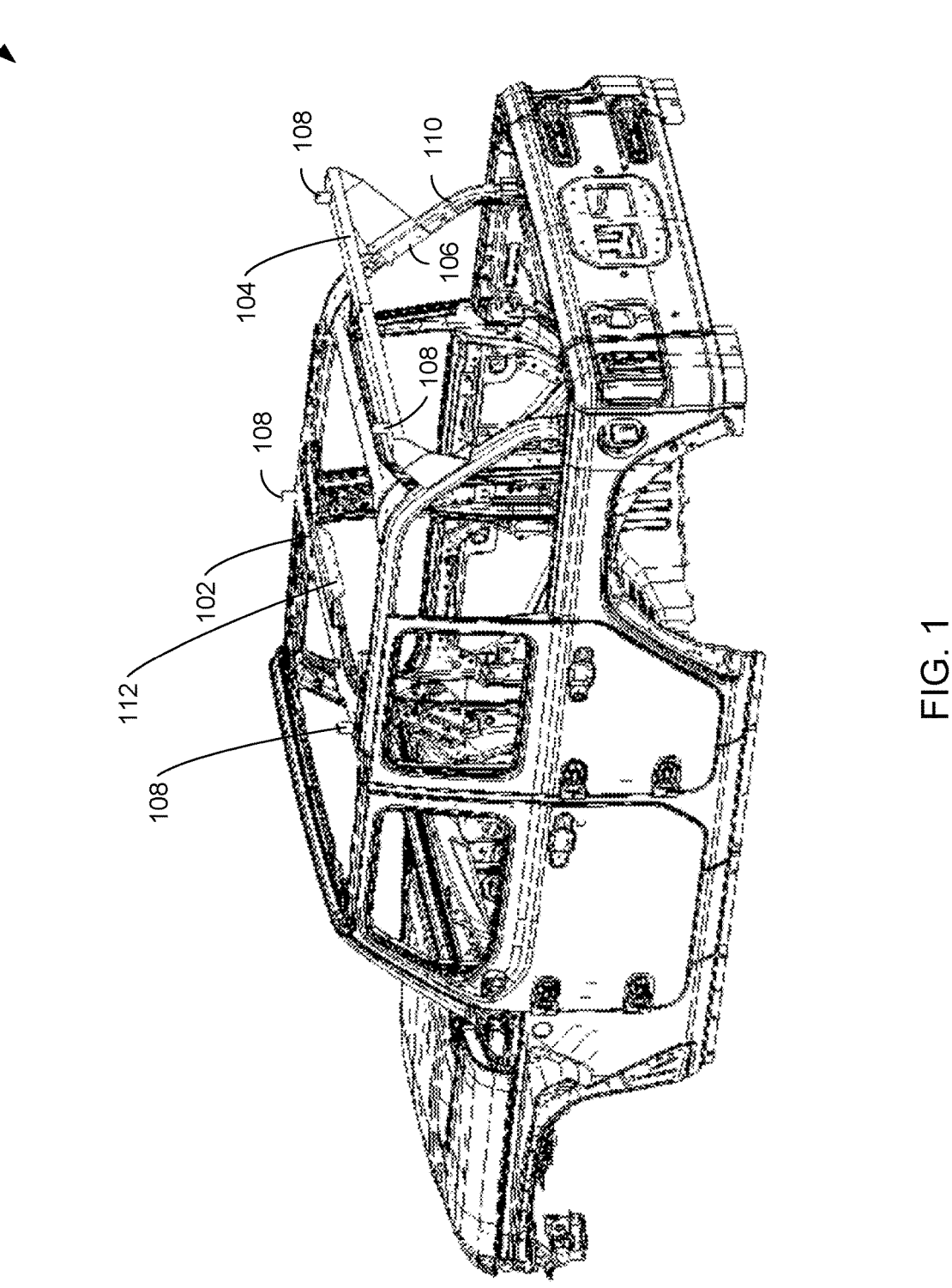
FIG. 1 illustrates a top perspective view of an interior load bearing framework of a vehicle in accordance with an embodiment of the present invention.

Turning to FIG. 1, a top perspective view of vehicle 100 is exemplified in which certain components (e.g., roof) of vehicle 100 are removed for clarity. A load bearing framework is illustrated, which may include portions of the endoskeleton (e.g., roll cage 110) of vehicle 100 along with brackets 102 and 104 that may be mounted thereto. In one embodiment, brackets 102 and 104 may be arranged in accordance with original equipment manufacturer (OEM) mount locations on the endoskeleton. As per one example, attach points 106 of bracket 104 may align to locations shared by other accessories that may be attached to roll cage 110 (e.g., a soft top not shown). Brackets 102 and/or 104 may, for example, further include accessory panel mounts 112 that may be used to mount accessory panels that may be used to organize user accessories (e.g., flashlights, fire extinguishers, first aid kits, etc.) within the cab of the vehicle.

Mount points (e.g., sockets 108) may, for example, be arranged on the load bearing framework and may be configured to extend through portions of the vehicle (e.g., roof not shown) to allow access to the load bearing framework via the mount points from an exterior of the vehicle (e.g., from above the roof not shown). In one embodiment, sockets 108 may be formed as hollow cylinders open on both ends to allow, for example, attachment of a vehicle accessory on one end (e.g., the open end of sockets 108 accessible from an exterior of the vehicle above the roof not shown) and to allow insertion of attachment hardware on the other end (e.g., the open end of sockets 108 accessible from an interior of the vehicle) so as to facilitate securement of the vehicle accessory to the load bearing framework via sockets 108.

Figure 2:
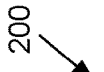
FIG. 2 illustrates a top perspective cutaway view of a load bearing framework in accordance with an embodiment of the present invention.
Figure 2:
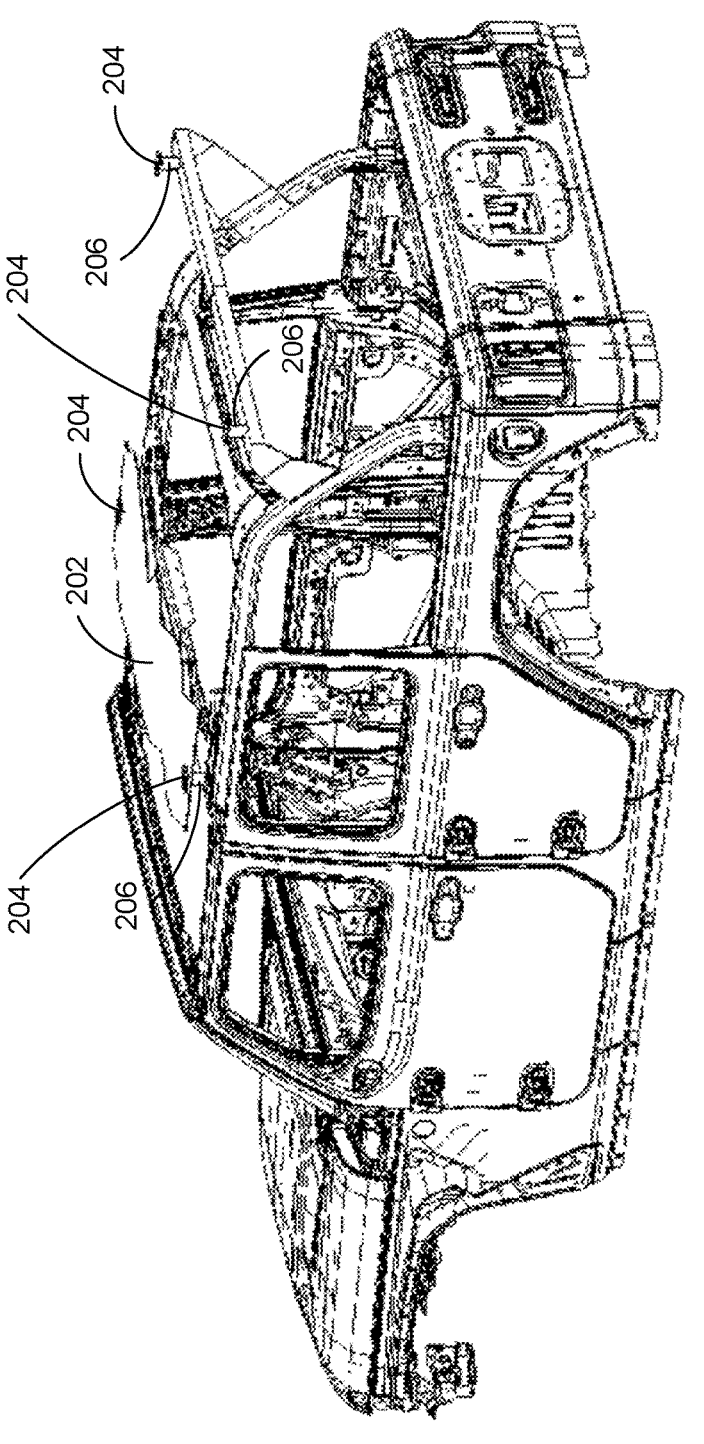

Turning to FIG. 2, a top perspective view of vehicle 200 is exemplified in which certain components (e.g., roof 202) of vehicle 200 are cutaway to better illustrate the protrusion of mount points (e.g., sockets 206) through portions of the vehicle (e.g., roof 202) to allow access to the load bearing framework from an exterior of the vehicle via sockets 206. As shown, plugs 204 may be utilized to cap the open end of sockets 206 that are exposed to the exterior of vehicle 200. In one embodiment, plugs 204 may be configured to seal an open end of sockets 206 thereby providing a smooth surface that not only may hide view of the open end of sockets 206 from an exterior of the vehicle, but also may provide an aesthetically pleasing and low-wind-resistance profile to roof 202 when no vehicle accessory is attached to sockets 206.

Figure 3:
FIG. 3 illustrates a top perspective exploded cutaway view of a vehicle and an associated vehicle accessory to be externally mounted to the vehicle's internal load bearing framework in accordance with an embodiment of the present invention.
Figure 4:
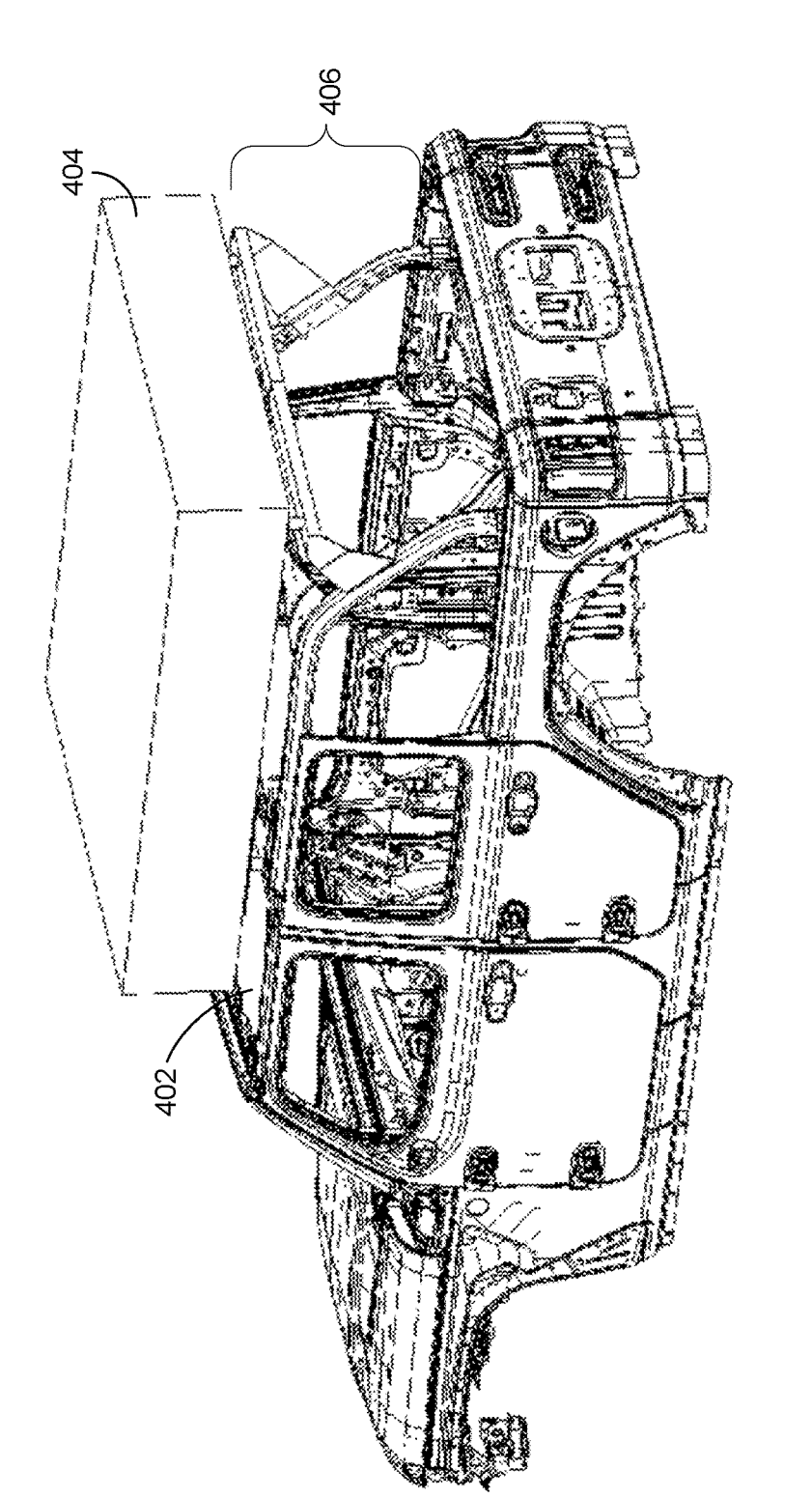
FIG. 4 illustrates a top perspective view of a vehicle accessory coupled to the load bearing framework of a vehicle in accordance with an embodiment of the present invention.

Turning to FIG. 3, a top perspective, exploded cutaway view of vehicle 300 is exemplified in which certain components (e.g., roof 302) of vehicle 300 are cutaway to better illustrate the protrusion of mount points (e.g., sockets 306) through portions of the vehicle (e.g., roof 302). Such protrusion allows engagement of features (e.g., posts 308 of vehicle accessory 304) to the load bearing framework from an exterior of the vehicle via an open end of corresponding sockets 306 as shown. Once posts 308 fully engage corresponding sockets 306 that are accessible from the exterior of vehicle 300, attachment hardware (not shown) may be inserted into the open end of sockets 306 that are accessible from the interior of vehicle 300 so as to secure vehicle accessory 304 to vehicle 300 as exemplified in FIG. 4.

It should be noted that vehicle accessory 404 may include virtually any accessory that may be mounted to vehicle 400 whereby all vehicle accessories 404 may be interchanged with vehicle 400 simply by lifting a first vehicle accessory 404 off of vehicle 400 and installing a second vehicle accessory 404 in its place as discussed above in relation to FIG. 3. Further, it is noted that vehicle accessory 404 may be fully supported by load bearing framework 406, which may include an endoskeleton fully encapsulated within an interior of vehicle 400 (e.g., as discussed above in relation to roll cage 110 of FIG. 1) and the associated brackets attached thereto (e.g., as discussed above in relation to brackets 102 and 104 of FIG. 1). As such, virtually any weight of external vehicle accessory 404 may be accommodated within the capabilities of internal load bearing framework 406 without damage to vehicle 400. Once vehicle accessory 404 is removed from vehicle 400, caps (e.g., plugs 204 as discussed above in relation to FIG. 2) may be inserted into the open end of the corresponding mount points so as to facilitate an aesthetically pleasing and low-wind-resistance profile to roof 402.

Other aspects and embodiments of the present invention will be apparent to those skilled in the art from consideration of the specification and practice of the invention disclosed herein. For example, external securement of a vehicle accessory to a load bearing framework internally mounted within the vehicle may be facilitated regardless of the roof option (e.g., hard top, soft top, bikini top, no top) that may be selected for the vehicle. It is intended, therefore, that the specification and illustrated embodiments be considered as examples only, with a true scope and spirit of the invention being indicated by the following claims.

What is claimed is:

1. A vehicle accessory mount system, comprising:
 a vehicle having a roof;
 a load bearing framework arranged within an interior of the vehicle, the load bearing framework including a plurality of sockets extending through the roof; and
 a vehicle accessory removably coupled to the load bearing framework, the vehicle accessory including a plurality of posts removably coupled to the corresponding plurality of sockets.

2. The vehicle accessory mount system of claim 1, further comprising a plurality of plugs inserted into a first open end of the plurality of sockets when the vehicle is devoid of a vehicle accessory.

3. The vehicle accessory mount system of claim 2, wherein the plurality of plugs improve vehicle aesthetics.

4. The vehicle accessory mount system of claim 2, wherein the plurality of plugs minimize wind resistance.

5. The vehicle accessory mount system of claim 1, wherein the load bearing framework includes a roll cage of the vehicle.

6. The vehicle accessory mount system of claim 5, wherein the load bearing framework further includes a bracket coupled to original equipment manufacturer attach points of the roll cage.

7. The vehicle accessory mount system of claim 1, wherein the vehicle accessory is secured to the load bearing framework from within an interior of the vehicle.

8. A vehicle accessory mount system, comprising:
 a vehicle;
 a load bearing framework arranged within an interior of the vehicle, the load bearing framework including a plurality of sockets extending through a roof of the vehicle; and
 a vehicle accessory removably coupled to the load bearing framework, the vehicle accessory including a plurality of posts removably coupled to the corresponding plurality of sockets.

9. The vehicle accessory mount system of claim 8, further comprising a plurality of plugs inserted into a first open end of the plurality of sockets when the vehicle is devoid of a vehicle accessory.

10. The vehicle accessory mount system of claim 9, wherein the plurality of plugs improve vehicle aesthetics.

11. The vehicle accessory mount system of claim 9, wherein the plurality of plugs minimize wind resistance.

12. The vehicle accessory mount system of claim 8, wherein the load bearing framework includes a roll cage of the vehicle.

13. The vehicle accessory mount system of claim 12, wherein the load bearing framework further includes a bracket coupled to original equipment manufacturer attach points of the roll cage.

14. The vehicle accessory mount system of claim 8, wherein the vehicle accessory is secured to the load bearing framework from within an interior of the vehicle.

15. A method of mounting accessories to a vehicle, comprising:

disposing a load bearing framework within an interior of a vehicle;

arranging a plurality of sockets on the load bearing framework that extend through a roof of the vehicle; and removably coupling an accessory to the plurality of sockets.

16. The method of claim 15, further comprising disposing plugs into the plurality of sockets in the absence of the accessory.

17. The method of claim 15, further comprising securing the accessory to the vehicle from within the vehicle.

18. The method of claim 17 wherein the accessory includes a plurality of plugs that removably insert into the corresponding plurality of sockets.

19. The method of claim 18, further comprising extending the plurality of sockets through a roof of the vehicle.

20. The method of claim 19, wherein only a portion of the plurality of sockets of the load bearing framework are visible from an exterior of the vehicle.

* * * * *